US012337306B2

(12) United States Patent
Makhania et al.

(10) Patent No.: US 12,337,306 B2
(45) Date of Patent: Jun. 24, 2025

(54) CATALYST REGNERATION WITH INVERTED COOLER

(71) Applicant: UOP LLC, Des Plaines, IL (US)

(72) Inventors: Minaz Makhania, Gurgaon (IN); Dharmesh Chunilal Panchal, Bracknell (GB); Sakthivelan Maadasamy Durai, Gurugram (IN); Lev Davydov, Northbrook, IL (US); Richard A. Johnson, II, Algonquin, IL (US); Sathit A. Kulprathipanja, Schaumburg, IL (US)

(73) Assignee: UOP LLC, Rosemont, IL (US)

( * ) Notice: Subject to any disclaimer, the term of this patent is extended or adjusted under 35 U.S.C. 154(b) by 862 days.

(21) Appl. No.: 17/550,041

(22) Filed: Dec. 14, 2021

(65) Prior Publication Data

US 2022/0193654 A1    Jun. 23, 2022

(30) Foreign Application Priority Data

Dec. 18, 2020   (IN) .............................. 202011055197

(51) Int. Cl.
   *B01J 38/04*       (2006.01)
(52) U.S. Cl.
   CPC ................................... *B01J 38/04* (2013.01)
(58) Field of Classification Search
   CPC ....... B01J 8/26; B01J 8/28; B01J 29/90; B01J 38/02; B01J 38/04; B01J 38/12; B01J 38/30; C10G 11/18; C10G 11/182; C10G 2300/70
   See application file for complete search history.

(56) References Cited

U.S. PATENT DOCUMENTS

| | | |
|---|---|---|
| 5,421,398 A | 6/1995 | Lomas |
| 2010/0150788 A1 | 6/2010 | Palmas et al. |
| 2012/0219467 A1 | 8/2012 | Palmas et al. |
| 2016/0169506 A1 | 6/2016 | Palmas et al. |

FOREIGN PATENT DOCUMENTS

| | | |
|---|---|---|
| CN | 103379959 A | 10/2013 |
| WO | 1993008912 A1 | 5/1993 |

OTHER PUBLICATIONS

Examination Report for corresponding Indian Application No. 202011055197 dated Jul. 12, 2022.
Office Action for corresponding CN Application No. 202111567690.5.

*Primary Examiner* — Brian A McCaig
(74) *Attorney, Agent, or Firm* — Paschall & Associates, LLC; James C. Paschall (57) ABSTRACT

Vent gases from a catalyst cooler are directed downstream or outside of the catalyst regenerator to avoid sending air to a location where after burn may occur. Vent gases contain oxygen that when contacted with carbon monoxide in regenerator flue gas can cause after burn to occur at a location which lacks sufficient catalyst density to serve as a heat sink. Locating the cooling media supply in the top of the catalyst cooler enables cooled catalyst to drain from the bottom of the catalyst cooler and fitting more cooler tubes in the catalyst cooler.

20 Claims, 3 Drawing Sheets

CATALYST REGENERATION WITH INVERTED COOLER

CROSS-REFERENCE TO RELATED APPLICATIONS

This application claims priority from Indian Provisional Application No. 202011055197, filed Dec. 18, 2020, which is incorporated herein in its entirety.

FIELD

The field is the regeneration of spent catalyst.

BACKGROUND

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst. A high temperature regeneration operation within a regenerator zone combusts coke from the catalyst. Coke-containing catalyst, referred to herein as coked catalyst, is continually removed from the reaction zone and replaced by essentially coke-free catalyst from the regeneration zone. Fluidization of the catalyst particles by various gaseous streams allows the transport of catalyst between the reaction zone and regeneration zone.

Conventional regenerators typically include a vessel having a coked catalyst inlet, a regenerated catalyst outlet and a combustion gas distributor for supplying air or other oxygen containing gas to the bed of catalyst that resides in the vessel. Cyclone separators remove catalyst entrained in the flue gas before the gas exits the regenerator vessel in a flue gas outlet.

Regenerators can be operated to with an air flow rate to promote full burn in which all carbon from coke is combusted to carbon dioxide or in partial burn in which some of the carbon from the coke is combusted only to carbon monoxide due to a scarcity of oxygen.

After burn is a phenomenon that occurs when hot flue gas that has been separated from regenerated catalyst contains carbon monoxide that combusts to carbon dioxide. After burn can be a risk in an upper, disengaging chamber which contains hot flue gas containing carbon monoxide that has been disengaged from catalyst, thereby providing a dilute catalyst phase. In this dilute phase of catalyst in a free board region, insufficient catalyst is present to serve as a heat sink to absorb the heat of combustion thus subjecting surrounding equipment to potentially damaging higher temperatures and perhaps creating an atmosphere conducive to the generation of nitrous oxides.

There are several types of catalyst regenerators in use today. The conventional bubbling bed regenerator typically has just one chamber in which air is bubbled through a dense catalyst bed. Coked catalyst is added to and regenerated catalyst is withdrawn from the same dense catalyst bed. Relatively little catalyst is entrained in the combustion gas exiting the dense bed. Bubbling beds can be operated in partial burn or in full burn. The former will have carbon monoxide present in the regenerator which can provide conditions in which afterburn can occur.

Some regenerators have two chambers. Two-stage bubbling beds have two chambers. Coked catalyst is added to a dense bed in a first, upper chamber and is partially regenerated with air. The partially regenerated catalyst is transported to a dense bed in a second, lower chamber and completely regenerated with air. The completely regenerated catalyst is withdrawn from the second chamber. Combustion gas comprising carbon monoxide from the second, lower chamber enters into the first, upper chamber thus providing conditions in which afterburn can occur.

Complete catalyst regeneration can be performed in a dilute phase, fast-fluidized, combustion regenerator. Coked catalyst is added to a lower chamber and is transported upwardly by air under fast fluidized flow conditions while completely regenerating the catalyst. The regenerated catalyst is separated from the flue gas by a primary separator upon entering into an upper chamber in which regenerated catalyst and flue gas are disengaged from each other. Only a small proportion of air added to the regenerator vessel is added to the upper chamber. Fast fluidized flow conditions may be maintained to effect complete combustion without the need for the additional combustion in the catalyst bed collected from the top of the riser. Carbon monoxide is not typically found in the upper chamber in combustor regenerators because complete combustion occurs during catalyst transport from the bottom chamber to the upper chamber generated by a large air flow rate.

An advanced two-stage regenerator feeds spent catalyst and combustion gas to a lower chamber like in the combustor, but the combustion gas is separated from the catalyst in the upper chamber of the second stage. Air is fed to the dense bed of catalyst in the upper chamber to finish the regeneration, but carbon monoxide in the combustion gas from the first stage is left in the free board region of the upper stage resulting in a partial burn condition. After burn is a concern for advanced two-stage regenerators.

Catalyst coolers have been used to cool regenerated catalyst and permit the regenerator and the reactor to operate under independent conditions. In catalyst coolers, hot regenerated catalyst is cooled by indirect heat exchange with water which vaporizes to steam. The steam is removed from the catalyst cooler for other uses; whereas, the cooled catalyst is returned to the regenerator. Air used to fluidize catalyst in the catalyst cooler can be vented to the regenerator.

Conventionally, manifolds for distributing coolant to cooler tubes were located in the bottom of the catalyst cooler. The drain from the catalyst cooler from which cooled catalyst exited was located in the side of the cooler. To prevent catalyst from exiting prematurely through the drain without undergoing cooling, a shelf was installed above the drain to prevent bypassing. The shelf took up space in the cooler which displaced cooler tubes, reducing transfer duty.

Ways are sought to efficiently utilize air to fluidize hot catalyst in catalyst coolers for regenerators.

BRIEF SUMMARY

Vent gases from a catalyst cooler are directed downstream or outside of the catalyst regenerator to avoid sending air to a location in which after burn may occur. Vent gases contain oxygen that when contacted with carbon monoxide in regenerator flue gas can cause after burn to occur at a location which lacks sufficient catalyst density to serve as a heat sink. The catalyst cooler has nested tubes for providing cooling media with the nested tubes comprising inner tubes with inlets above the outlets. This arrangement enables locating the catalyst drain in the bottom of the cooler which permits employment of more cooler tubes.

DEFINITIONS

The term "communication" means that fluid flow is operatively permitted between enumerated components, which may be characterized as "fluid communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "bypass" means that the object is out of downstream communication with a bypassing subject at least to the extent of bypassing.

The term "predominant", "predominance" or "predominate" means greater than 50%, suitably greater than 75% and preferably greater than 90%.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86 or TBP, as the case may be.

DETAILED DESCRIPTION

We have found that venting air from a catalyst cooler to downstream or outside of the regenerator prevents after burn that can result in venting the cooler gas to the regenerator. The process and apparatus are particularly advantageous for regenerators that operate under partial burn conditions. Additionally, locating the manifolds for the cooling tubes on the top of the catalyst cooler enables more cooler tubes to be employed in the cooler due to the catalyst drain being located in the bottom of the cooler instead of in the side.

Figures 1, 2:
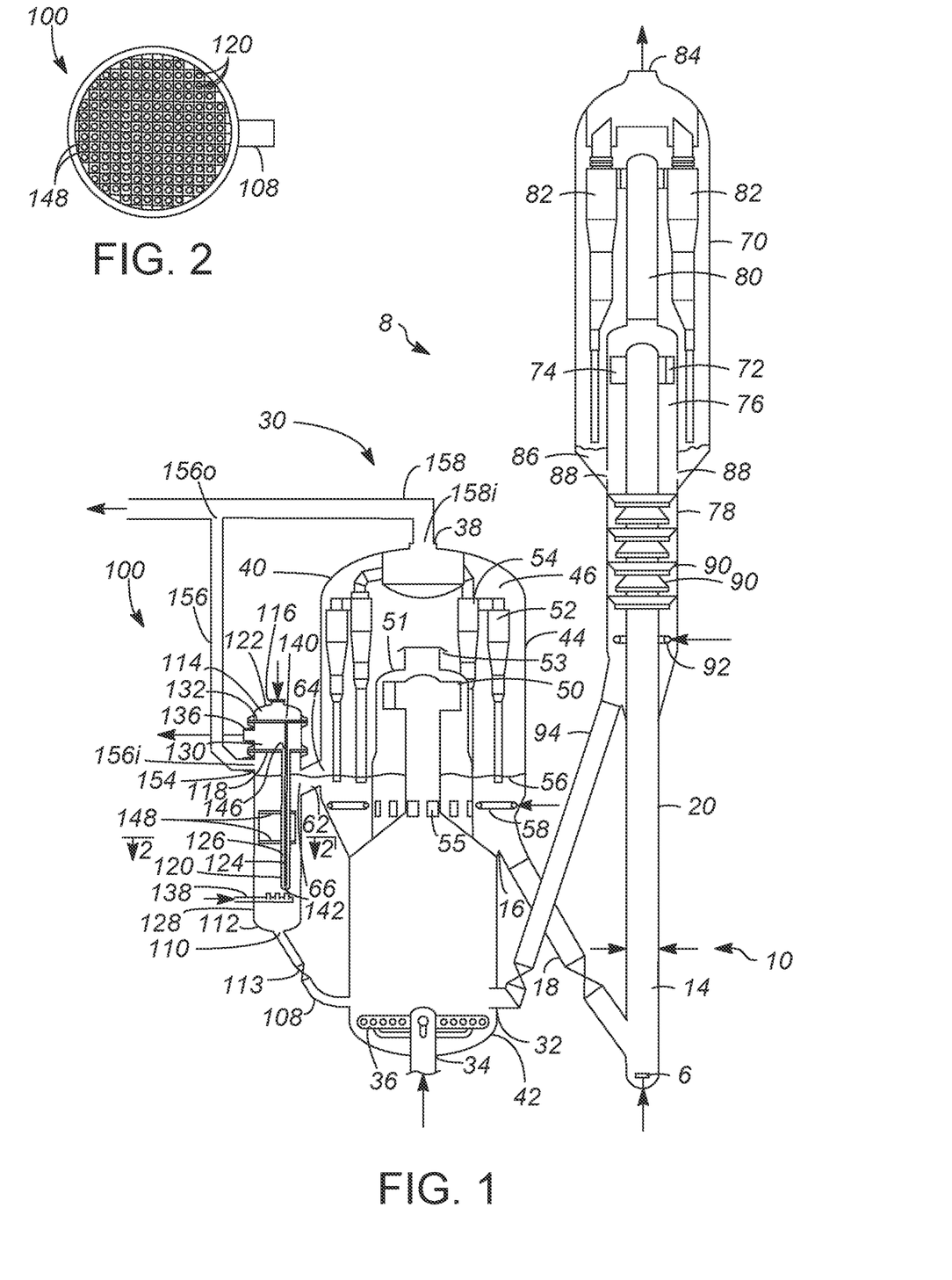
FIG. 1 is a schematic drawing of a process of one embodiment of the present disclosure.
FIG. 2 is a sectional taken along segment 2-2 of FIG. 1.

As shown in FIG. 1, a process and apparatus comprise an FCC unit 8. Hydrocarbon feedstock may be sprayed by distributors 10 into a riser 20 where it contacts catalyst. In general, feedstock may be cracked in the riser 20 in the presence of catalyst to form a gaseous cracked product stream.

The most common of such conventional hydrocarbon streams is a VGO, which is typically a hydrocarbon material prepared by vacuum fractionation of atmospheric residue having a boiling range with an IBP of at least about 232° C. (450° F.), a T5 of about 288° C. (550° F.) to about 343° C. (650° F.), a T95 between about 510° C. (950° F.) and about 570° C. (1058° F.) and/or an EP of no more than about 626° C. (1158° F.). Atmospheric residue is an alternative feedstock obtained from the bottoms of an atmospheric crude distillation column boiling with an IBP of at least about 315° C. (600° F.), a T5 between about 340° C. (644° F.) and about 360° C. (680° F.) and/or a T95 of between about 700° C. (1292° F.) and about 900° C. (1652° F.). A typical VGO normally has a boiling point range between about 315° C. (600° F.) and about 565° C. (1050° F.).

The FCC catalyst can be a single catalyst or a mixture of different catalysts. Generally, the catalyst may include any of the well-known catalysts that are used in the art of FCC, such as an active amorphous clay-type catalyst and/or a high activity, crystalline molecular sieve. Zeolites may be used as molecular sieves in FCC processes. Typically, the zeolitic molecular sieves appropriate for FCC have a large average pore size. Usually, molecular sieves with a large pore size have pores with openings of greater than about 0.7 nm in effective diameter defined by greater than about 10, and typically about 12, member rings. Pore Size Indices of large pores can be above about 31. Suitable large pore zeolite catalysts may include synthetic zeolites such as X and Y zeolites, mordenite and faujasite. The zeolite can have any suitable amount of a rare earth metal or rare earth metal atoms in oxide form. Suitably, the FCC catalyst includes a large pore zeolite, such as a Y-type zeolite, and a matrix material comprising an active alumina material, a binder material, including either silica or alumina, and an inert filler such as kaolin. The ratio of zeolite to matrix in the FCC catalyst stream should be no more than 2. Suitable FCC catalysts include Amber from Albemarle Corporation located in Baton Rouge, Louisiana, Stamina from BASF Corporation from Iselin, New Jersey or Midas from WR Grace and Co. from Columbia, Maryland.

Catalyst additives may be added to the catalyst composition during operation. Medium pore sized molecular sieves such as MFI with openings of 0.7 nm or less may be blended in with the large pore molecular sieves to increase production of lighter olefins. In some cases, only medium pore sized molecular sieves may be used if the feed to the riser is an FCC product cut such as a naphtha stream.

The riser 20 may operate with catalyst-to-oil ratio of between about 4 and about 20, preferably between about 5 and about 12. Inert gas to the riser 20 may be between about 1 and about 15 wt-% of hydrocarbon feed, preferably between about 4 and about 12 wt-%. Before contacting the catalyst, the hydrocarbon feed may have a temperature in a range of from about 149° C. (300° F.) to about 427° C. (800° F.), preferably between about 204° C. (400° F.) and about 288° C. (550° F.). The riser 20 may operate in a temperature range of between about 427° C. (800° F.) and about 649° C. (1200° F.), preferably between about 482° C. (900° F.) and about 593° C. (1100° F.). The pressure in the riser 20 may be between about 69 (10 psig) and about 311 kPa (45 psig).

As shown in FIG. 1, regenerated catalyst is delivered to the riser 20 from regenerator standpipe 18. In an embodiment, lift gas which may include inert gas such as steam may be distributed by lift gas distributor 6 to lift catalyst upwardly from a lower section 14 of the riser 20. Feed sprayed from a distributor 10 contacts lifted, fluidized catalyst and moves upwardly in the riser 20 with the catalyst as the hydrocarbon feed cracks to smaller hydrocarbon cracked products. The cracked products and spent catalyst enter the reactor vessel 70 and are then discharged from the top of the riser 20 through the riser outlet 72 and separated into a cracked product vapor stream and a collection of catalyst particles covered with substantial quantities of coke and generally referred to as spent catalyst. A swirl arm arrangement 74, provided at the end of the riser 20, may further enhance initial catalyst and cracked hydrocarbon separation by imparting a tangential velocity to the exiting catalyst and cracked product vapor stream mixture. The swirl arm arrangement 74 is located in an upper portion of a separation chamber 76, and a stripping zone 78 is situated in the lower portion of the separation chamber 76. Catalyst separated by the swirl arm arrangement 74 drops down into the stripping zone 78.

The cracked product vapor stream comprising cracked hydrocarbons including naphtha, light olefins and some catalyst may exit the separation chamber 76 via a gas conduit 80 in communication with cyclones 82. The cyclones 82 may remove remaining catalyst particles from the product vapor stream to reduce particle concentrations to very low levels. The product vapor stream may exit the top of the reactor vessel 70 through a product outlet 84. Catalyst separated by the cyclones 82 returns to the reactor vessel 70 through dip legs into a dense bed 86 where catalyst will pass through chamber openings 88 and enter the stripping zone 78. The stripping zone 78 removes adsorbed and entrained hydrocarbons from the catalyst by counter-current contact with an inert gas such as steam over the optional baffles 90. Steam may enter the stripping zone 78 through a distributor 92. A spent catalyst conduit 94 transfers coked catalyst, regulated by a control valve, to a catalyst regenerator 30. Additionally, a spent catalyst recycle conduit (not shown) may transfer some spent catalyst back to the riser 20 below the feed distributor arrangement 10 without undergoing regeneration.

As shown in FIG. 1, the catalyst regenerator 30 receives the coked catalyst delivered through a catalyst inlet 32 and typically combusts the coke from the surface of the catalyst particles by contact with an oxygen-containing gas to produce regenerated catalyst and flue gas. The catalyst regenerator 30 comprises a regenerator shell 40. The oxygen-containing combustion gas such as air enters the bottom of the regenerator 30 via an inlet 34 to a combustion gas distributor 36. Flue gas and entrained catalyst pass upwardly through the regenerator 30. Flue gas exits the regenerator through a flue gas outlet 38.

The regenerator 30 may take on one of several configurations. The catalyst regenerator 30 may comprise a shell 40 that has a single chamber in which air is only distributed to the chamber below a bed of catalyst. Air is bubbled through the catalyst to combust coke from the catalyst to provide regenerated catalyst and flue gas which exit the regenerator vessel 40 in separate exits.

The catalyst regenerator 30 may comprise a shell 40 comprising a lower chamber 42 and an upper chamber 44. The catalyst regenerator may be a two-stage regenerator in which air is delivered to the upper, first-stage chamber 44 and the lower, second-stage chamber 42. In a two-stage regenerator, about 20 to about 40 wt-% of the air is delivered to the lower chamber 42. Oxygen depleted air from the lower chamber and the balance of total air delivered to the catalyst regenerator are delivered to the upper chamber 44. The spent catalyst is first delivered to the upper, first-stage chamber 44. Partially regenerated catalyst is then passed downwardly to the second-stage chamber 42 to contact fresh air and finish the regeneration process.

The catalyst regenerator 30 may also comprise a combustor regenerator. In a combustor regenerator, spent catalyst enters the lower chamber 42, called the combustion chamber, in which coke is combusted from the catalyst with air from the combustion gas distributor 36. Catalyst and flue gas are transported from the lower chamber 42 to the upper chamber 44. A primary separator initially separates regenerated catalyst from flue gas. Regenerator cyclones 52, 54, or other means, remove entrained catalyst particles from the rising flue gas before the flue gas exhausts from the regenerator 30 through the flue gas outlet 38 into a flue gas conduit 158 in the upper chamber 44 of the regenerator 30.

The catalyst regenerator 30 may also comprise an advanced two-stage regenerator. In a advanced two-stage regenerator 30, spent catalyst enters the lower chamber 42, called the first stage, in which coke is combusted from the catalyst with air from the combustion gas distributor 36. Catalyst and flue gas are transported from the lower chamber 42 to the upper chamber 44. A primary separator, such as a swirl arm arrangement 50 located in a disengagement can 51, initially separates regenerated catalyst from flue gas. The flue gas comprising carbon monoxide exits the disengagement can 51 through vents 53 in the top and enters a free board region 46 while partially regenerated catalyst falls into the dense catalyst bed having an upper level 56 inside the disengagement can 51. Windows 55 in the disengagement can 51 permit catalyst to exit the disengagement can and enter into an annulus of the upper chamber 44. Regenerator cyclones 52, 54, or other means, remove entrained catalyst particles from the rising flue gas before the flue gas exhausts from the regenerator 30 through the flue gas outlet 38 into a flue gas conduit 158. In an embodiment, the flue gas outlet 38 is in the upper chamber 44 of the regenerator 30. Disengaged catalyst collected in the upper chamber 44 in the dense bed having an upper level 56 is fluidized by and regenerated with air from an upper air distributor 58 to complete catalyst regeneration. Combustion of coke from the catalyst particles raises the temperature of the catalyst. Disengaged regenerated catalyst may exit from the regenerator 30 through a regenerated catalyst outlet 16 to a regenerator standpipe 18. The regenerated catalyst may pass through the regenerator standpipe 18, regulated by a control valve, to the lower section 14 of the riser 20. To ensure complete regeneration of catalyst, air in the upper chamber 44 is directed to the catalyst bed 56. Flue gas separated from the catalyst in the upper chamber 44 comprises substantial carbon monoxide which is not combusted to carbon dioxide; thus operating in partial burn mode.

Regenerated catalyst from the regenerator standpipe 18 will usually have a temperature in a range from about 649° C. (1200° F.) to about 760° C. (1400° F.). If air is used as the oxygen-containing gas, the dry air rate to the regenerator may be between about 8 and about 15 kg/kg coke. The hydrogen in coke may be between about 4 and about 8 wt-%, and the sulfur in coke may be between about 0.6 and about 3.0 wt-%. In complete combustion regenerators, sufficient oxygen is provided to completely oxidize coke to carbon dioxide. In partial burn regenerators, insufficient oxygen is provided to completely oxidize coke to carbon dioxide such that a ratio of carbon dioxide to carbon monoxide is between about 1 to about 5.

At least one catalyst cooler 100 is provided to receive hot regenerated catalyst from the regenerator 30 for cooling the regenerated catalyst. In FIG. 1, the catalyst cooler 100 may be appended to the upper chamber 44 for receiving hot catalyst. A catalyst pipe 62 transfers catalyst from the regenerator 30 through a cooler catalyst outlet 64 to the catalyst cooler 100 through a hot catalyst inlet 66. In an embodiment, the catalyst pipe 62 transfers catalyst from the upper chamber 44 through a cooler catalyst outlet 64 to the catalyst cooler 100 through a hot catalyst inlet 66. The cooler catalyst outlet 64 is preferably provided in the upper chamber 44, so hot catalyst is withdrawn from the upper chamber 44 for transport to the hot catalyst inlet 66. More than one catalyst cooler may be used although only one is shown in the FIG. 1.

The catalyst cooler 100 shown in the FIG. 1 is a flow-through type cooler. A catalyst cooler tube 120 is located in the catalyst cooler 100 for cooling hot regenerated catalyst from the regenerator 30. Preferably, a plurality of catalyst cooler tubes 120 are located in the catalyst cooler 100 to cool the catalyst before it exits from the catalyst cooler 100 through a cooled catalyst drain 110 to a cooled catalyst pipe 108. The bottom of the catalyst cooler 100 may comprise a frustoconical or hemispherical head 112. The cooler tubes 120 enable recovery and removal of heat from the regenerated catalyst caused by combustion of coke in the regenerator 30.

Even though only one cooler tube 120 is shown in the catalyst cooler 100, preferably, there are between about 50 and about 350 heat exchange tubes 120 located in the catalyst cooler 100 and more preferably between about 75 and 300 heat exchange tubes 120. Heat is typically removed from the catalyst by heat exchange to produce steam which can be used elsewhere in the refinery. A catalyst control valve 113 regulates the amount of catalyst exiting cooled catalyst drain 110 through cooled catalyst pipe 108 and thus entering the catalyst cooler 100 from the regenerator 30 and thereby controls the temperature in regenerator vessel 40. The cooled catalyst may enter the regenerator 30. In an aspect, the cooled catalyst pipe 108 delivers cooled catalyst to the lower chamber 42 of the regenerator 30.

Regenerated catalyst entering catalyst cooler 100 through the hot catalyst inlet 66 contacts catalyst heat exchange tubes 120. Catalyst drifts downwardly through catalyst cooler 100 into a lower portion of the cooler and exits through cooled catalyst drain 110 below the hot catalyst inlet 66.

The catalyst cooler 100 is typically "cold-walled". The term "cold-walled" means that the metal shell 128 of the cooler 100 is coated with an inner insulative refractory lining. However, in an embodiment, the shell 128 may be without an insulative refractory lining which is considered "hot-walled." Additionally, parts of the cooler 100 may be additionally inner lined with an abrasion resistant coating. The shell 128 of the cooler 100 may be made of carbon or stainless steel.

The catalyst cooler comprises an inlet manifold 114 and an outlet manifold 130 located in a top of the catalyst cooler 100. This allows liquid cooler fluid to flow into the inlet manifold 114 and flow down into the cooling tubes 120. Water may flow from a tank located above the catalyst cooler 100 to allow gravity to assist flow into the catalyst cooler 100 or water may be pumped from a tank located at an even or lower elevation. A lower tube sheet 118 may be bolted between a flange at an upper end of a shell 128 of the cooler 100 and a lower flange at a lower end of the outlet manifold 130. An upper tube sheet 132 may be bolted between a flange at the upper end of the outlet manifold 130 and a lower end of the upper head 122 of the cooler 100. Grates 148 extend horizontally in the catalyst cooler 100 to stiffen the bundle of heat exchange tubes 120 vertically aligned in catalyst cooler 100. Grates 148 may define openings through which heat exchange tubes extend. There may be at least two layers of grates 148 in each catalyst cooler 100. Grates are secured to the heat exchange tubes 120 and to each other by vertical support rods which may be made of the same material as the heat exchange tubes 120. The grates 148 and the heat exchange tubes 120 are enabled to thermally expand together as necessary without binding.

In an embodiment, boiler feed water may be the heat exchange fluid, but other types of heat exchange fluid are contemplated including water with additives to affect the boiling point of the fluid. Boiler feed water may enter the inlet manifold 114 through cooling medium nozzle 116 at or near the top of the catalyst cooler 100. In an embodiment, the inlet manifold 114 is defined between an upper head 122 of the cooler 100 and an upper tube sheet 132. Preferably, catalyst heat exchange tubes 120 have an inlet 140 and an outlet 146 at or near the top of the cooler 100. Preferably catalyst heat exchange tubes 120 are bayonet-style, nested tubes which each comprise an inner tube 124 and an outer tube 126. The inner tube 124 extends into and through a predominance of a length of the outer tube 126. Each inner tube 124 nested in the outer tube 126 may be concentric. The inner tube 124 of heat exchange tube 120 is secured to, extends through and projects from the upper tube sheet 132. Inlets 140 of inner tubes 124 fluidly communicate with inlet manifold 114. Cooling media which may be boiler feed water may enter the inlet manifold 114 as a liquid, flow into inlets 140 and flow down the inner tube 124 of the heat exchange tube 120. Cooling media travels down the length of the inner tube 124 and exits outlets 142 of inner tubes 124. The cooling media then reverses direction and flows up the outer tube 126 which surrounds inner tube 124. If the cooling media is water, the heat from the regenerated catalyst vaporizes the liquid water to steam particularly in the outer tube 126. The catalyst contacts an outer surface of the outer tube 126 of the cooler tubes 120 and is cooled. The inlet 140 of the inner tube 124 is above the outlet 142 of the inner tube, and in an embodiment, the inlets 140 of the inner tubes 124 are above the outlets 142 of the inner tubes.

Heat from the catalyst is indirectly exchanged with the cooling media in the outer tubes 126. The indirect heat exchange raises the temperature of the cooling media in the outer tubes 126. This contact with outer tubes 126 lowers the temperature of the catalyst descending in the catalyst cooler 100. The heated cooling media, such as boiler feed water and steam, from the outer tubes 126 are directed out of outlets 146 of outer tubes 126 and into the outlet manifold 130 defined between upper tube sheet 132 and the lower tube sheet 118 in the catalyst cooler 100. Outer tubes 126 are secured to, extend through and project from lower tube sheet 132. Outlets 146 of outer tubes 126 fluidly communicate with the outlet manifold 130. Fluid in the outlet manifold 130 is then transported out of catalyst cooler 100 through nozzle 136 perhaps into a circulation drum where the vapor and heated boiler feed liquid are separated. The cooled catalyst then travels out of the catalyst cooler 100 through the cooled catalyst drain 110 into the cooled catalyst pipe 108 which communicates the catalyst cooler with the regenerator 30 through a catalyst recirculation valve 113. A catalyst distributor may distribute catalyst into the regenerator 30.

A fluidizing gas is also distributed to the catalyst cooler 100 by a distributor 138 with nozzles. Preferably, the distributor 138 is located below the heat exchange tubes 120 with nozzles directing the fluidizing gas downwardly in the catalyst cooler 100. Single of multiple fluidizing gas distributors 138 may be located at a bottom of the catalyst cooler 100 and at more elevations along the catalyst cooler height. The fluidizing gas distributor 138 may have upwardly or downwardly directed nozzles. A gas such as air is used to fluidize the catalyst particles entering catalyst cooler 100 through the hot catalyst inlet 66. The flow rate of the fluidizing gas should be sufficiently high to accomplish fluidization of the catalyst. The fluidizing gas used in catalyst cooler 100 improves the heat transfer between catalyst and heat exchange tubes 120 by generating turbulence which enhances the heat transfer coefficient between the catalyst and the heat exchange tubes 120. The two ways to control the temperature of the circulated catalyst is to either control the amount of catalyst flowing through catalyst cooler 100 by the catalyst recirculation valve 113 or to vary the fluidizing gas rate distributed to catalyst cooler 100 through the distributor 138.

A top of the catalyst cooler 100 may be provided with a vent nozzle 154 for allowing a cooler gas stream comprising fluidizing gas and gas carried over from the regenerator 30 to exit the catalyst cooler. The vent nozzle 154 may be optional. The vent nozzle 154 may be omitted if the catalyst inlet 166 is located close to the lower tube sheet 118 to enable accumulated gas to belch back into the regenerator 30 through the catalyst pipe 62.

The vent gas from the catalyst cooler may comprise a significant concentration of oxygen because the regenerated catalyst entering the catalyst cooler may not have sufficient coke to consume the oxygen in the catalyst cooler particularly from the fluidizing gas provided by distributor 138. Moreover, the regenerator 30 may include a significant concentration of carbon monoxide, particularly if the regenerator is operating in partial burn, at least in the upper chamber 44. Thus, feeding the vent gas to the regenerator 30 or to the upper chamber 44 thereof may present large risk for after burn which can damage regenerator equipment especially in a free board region 46 above the dense catalyst bed upper level 56 in which catalyst is in a dilute phase. In the free board region 46, insufficient catalyst is present to absorb the intense heat generated in the event of after burn. Equipment instead will absorb the heat which may result in equipment damage.

It is proposed to vent the cooler gas stream to downstream or outside of the regenerator 30 to avoid feeding the oxygen containing cooler gas to a hot region containing carbon monoxide with dilute catalyst. A vent 156 has an inlet end 156$i$ and an outlet end 156$o$. The inlet end 156$i$ may be in the vent nozzle 154 in an embodiment. A vent pipe 156 communicates the vent nozzle 154 with a vessel or conduit that is in downstream communication with the regenerator 30. The cooler gas stream from the vent 156 vents through the outlet end 156$o$ into the flue gas stream in the flue gas conduit 158 to avoid feeding oxygen-containing gas from the catalyst cooler 100 into a free board region 46 of the upper chamber 44 of the regenerator 30 which may have great potential for afterburn due to high carbon monoxide concentration. Hence, the cooler gas stream 100 in the vent 156 bypasses the regenerator 30.

In FIG. 1, the outlet end 156$o$ of the vent 156 is connected with a flue gas conduit 158. The flue gas conduit 38 has an inlet 158$i$ in downstream communication with the flue gas outlet 38 and the regenerator 30. The vent pipe 156 may be vertical for at least 70% of its length to allow catalyst to freely drain back into the catalyst cooler 100.

The vent nozzle 154 and specifically, the inlet end 156$i$ of the vent 156 is above the outlet 66 of the pipe which delivers regenerated catalyst to the catalyst cooler 100. The regenerated catalyst is passed to the catalyst cooler 100 through catalyst pipe 62 below where the cooler gas stream is vented from said catalyst cooler in the inlet end 156$i$ of the vent 156. This enables the upper level 56 of the dense bed in the regenerator 30 to be contiguous with the upper level of the dense bed in the catalyst cooler 100. In an aspect, the upper level 56 of the dense bed extends from the regenerator 30 through the catalyst pipe 62 into the catalyst cooler 100. In a further aspect, the upper level 56 of the dense bed extends from the disengaging can 51 in the upper chamber 44 of the regenerator 30 through the catalyst pipe 62 into the catalyst cooler 100. The upper level 56 of the dense bed in the regenerator 30 is at about the same height as the level of the dense bed in the catalyst cooler 100. In an embodiment, the upper level 56 of the dense bed in the upper chamber 44 of the regenerator 30 is at about the same height as the level of the dense bed in the catalyst cooler 100. The region in the catalyst cooler above the catalyst inlet 66 and below the outlet manifold 130 adjacent to the vent 154 will catalyst and fluidize gas to back mix and enable additional heat transfer.

FIG. 2 is a sectional view of the catalyst cooler 100 taken along segment 2-2. The cross section of the catalyst cooler 100 may be circular or ovular and the plurality of heat transfer 120 tubes may fill the entire cross section. Refractor shelves were necessary to prevent bypassing of catalyst without cooling into the catalyst drain conventionally located in the side of the catalyst cooler. With the catalyst drain 110 in the bottom of the catalyst cooler 100, no refractor shelf is required and the cooler tubes 120 may fill the entire cross section of the catalyst cooler. Grates 148 for maintaining the cooler tubes 120 in place and the cooled catalyst pipe 108 are also visible in FIG. 2.

The heat exchange tubes 120 may be made of a chromium-molybdenum-iron alloy because this alloy is resistant to corrosion from trace chlorides in the boiler feed water if used as the heat exchange liquid.

Figure 3:
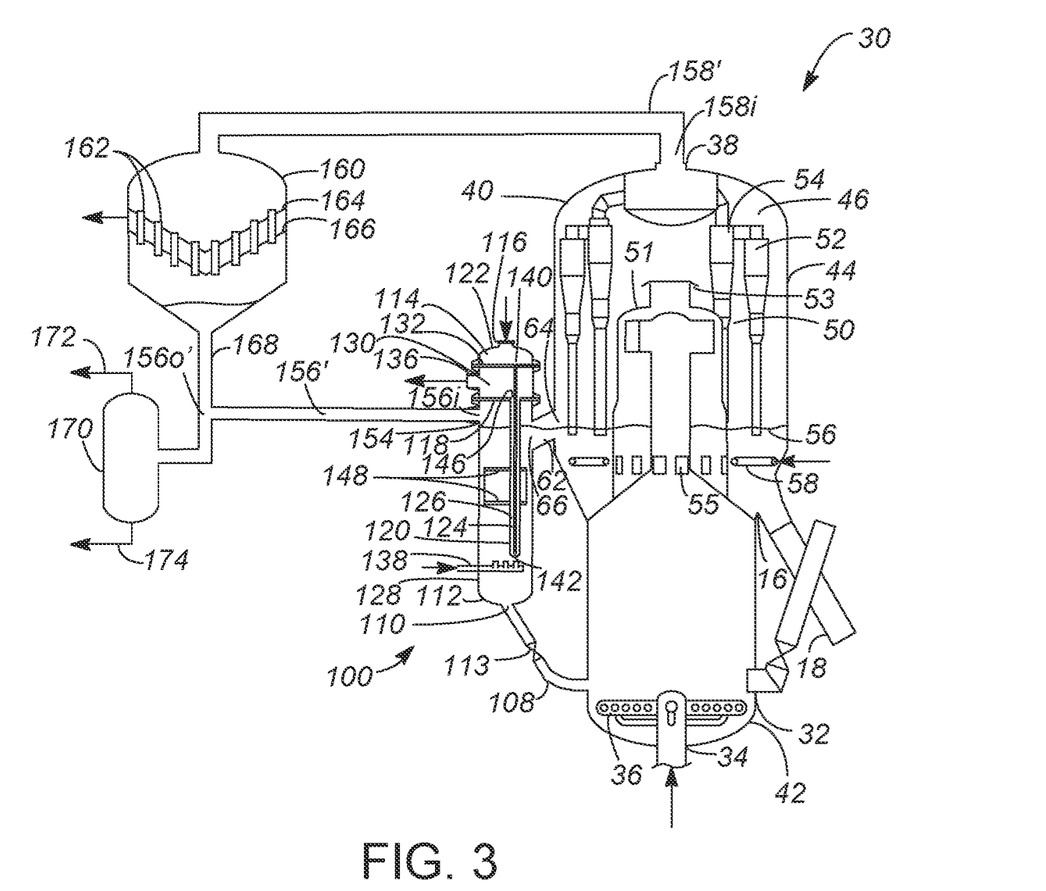
FIG. 3 is an alternative embodiment of FIG. 1.

FIG. 3 shows an embodiment of a regenerator vessel 30 and catalyst cooler 100 of FIG. 1 in which the vent 156' may be connected downstream of the flue gas conduit 158. Elements in FIG. 3 with the same configuration as in FIG. 1 will have the same reference numeral as in FIG. 1. Elements in FIG. 3 which have a different configuration as the corresponding element in FIG. 1 will have the same reference numeral but designated with a prime symbol ('). The configuration and operation of the embodiment of FIG. 3 is essentially the same as in FIG. 1.

In FIG. 3, the outlet end 156$o$' of the vent 156' is connected to a separator for separating catalyst fines from the flue gas stream. The flue gas conduit 158' is connected to a third stage separator 160. The third stage separator 160 has a plurality of cyclones 162 between two tube sheets 164, 166 for separating catalyst fines from the flue gas stream. The cyclones further separate catalyst fines from flue gas by centripetal force and direct clean flue gas between the tube sheets 164, 166 and dispense the concentrated catalyst fines below the tube sheets which collect in an underflow line 168. The underflow stream concentrated with catalyst fines is transported in the underflow line 168 to a fourth stage separator 170.

The fourth stage separator also conducts a further separation of catalyst fines from the underflow gas in line 168 by centripetal separation. A defined gas stream is produced in the fourth stage separator in line 172 and a catalyst fines stream is produced from the fourth stage separator in line 174. The fourth stage separator 170 may also be a barrier filter.

The cooler gas vent line 156' may deliver the cooler gas stream to either the TSS 160 or the fourth stage separator 170. The cooler gas stream comprises catalyst fines that also require separation from the cooler gas. However, because the underflow line 168 has a larger concentration of catalyst fines it may better serve as a heat sink if any combustion occurs to absorb heat in preference to the surrounding equipment. In an embodiment, the outlet end 156o' of the vent 156' is connected to the underflow line 168. The cooler gas stream is vented from the outlet end 156o' of the vent line 156' to the underflow line 168. The outlet end 156o' may be located in the fourth stage separator 170 instead of in the underflow line 168, such that the vent line 156' transports cooler gas directly to the fourth stage separator. Catalyst fines in the cooler gas stream may be separated from the cooler gas stream in the fourth stage separator 170. The third stage separator 160 may be omitted in this embodiment such that flue gas in line 158' is directed in the flue gas conduit 158' to the fourth stage separator 170 while bypassing the omitted TSS 160.

Figure 4:
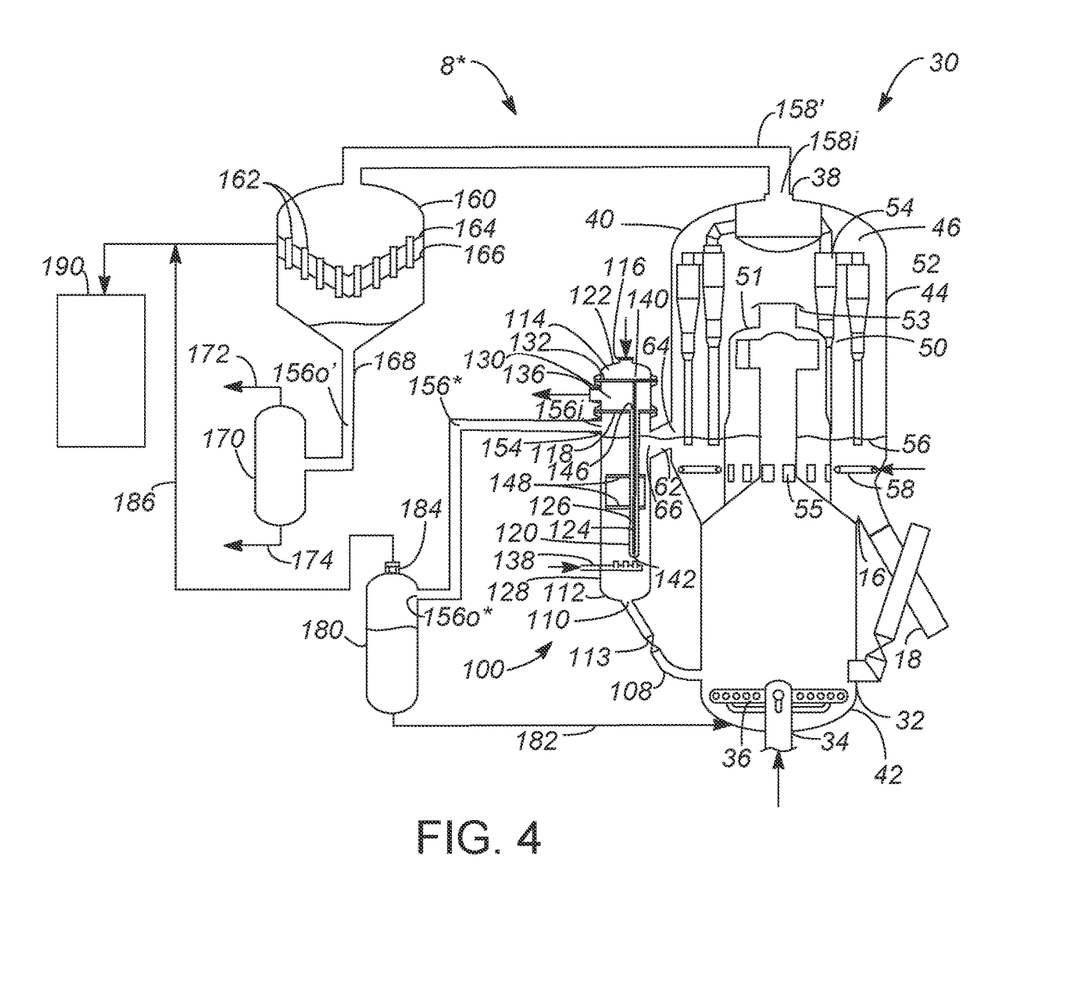
FIG. 4 is an alternative embodiment of FIG. 3.

FIG. 4 shows an embodiment of a regenerator vessel 30 and catalyst cooler 100 in which the vent 156* may be connected outside of the regenerator 30 or the flue gas conduit 158 to a catalyst storage unit 180. Elements in FIG. 4 with the same configuration as in FIG. 3 will have the same reference numeral as in FIG. 3. Elements in FIG. 4 which have a different configuration as the corresponding element in FIG. 3 will have the same reference numeral but designated with a prime symbol (*). The configuration and operation of the embodiment of FIG. 4 is essentially the same as in FIG. 3.

In FIG. 4, the outlet end 156o* of the vent 156* is connected to a vessel 180 that includes a filter 184 such as a dust control unit to separate catalyst fines from the cooler gas stream by filtration to provide a filtered cooler gas stream. The cooler gas stream is vented from the vent 156* to the vessel 180. In an embodiment, the vessel 180 may be a catalyst containment vessel 180. The catalyst containment vessel may store catalyst for resupply to the FCC unit 8* perhaps through a catalyst feed line 182 that feeds the regenerator 30. The catalyst containment vessel 180 may have a filtration unit 184 in the top to filter catalyst fines from gas that vents from the catalyst containment vessel. The filtered cooler gas stream may exit from the catalyst containment vessel in line 186. Line 186 may direct the filtered cooler gas stream to a CO boiler 190 where carbon monoxide remaining in the filtered cooler gas stream is combusted to generate steam. Clean gas from the TSS 160 may also be directed to the CO boiler 190 after optional heat exchange and expansion to recover energy. Line 186 may direct the filtered cooler gas stream to dissipate to atmosphere particularly when the regenerator 30 is an advanced two-stage regenerator due to lower levels of carbon monoxide emission in the flue gas.

Providing the cooler gas stream to a location downstream and/or outside of the regenerator 30 prevents afterburn in the regenerator. Additionally, locating the cooling media supply in the top of the catalyst cooler 100 enables cooled catalyst to drain from the bottom of the catalyst cooler and fitting more cooler tubes 120 in the catalyst cooler.

SPECIFIC EMBODIMENTS

While the following is described in conjunction with specific embodiments, it will be understood that this description is intended to illustrate and not limit the scope of the preceding description and the appended claims.

A first embodiment of the disclosure is an catalyst regenerator comprising a shell defining a chamber; a catalyst inlet to the chamber for delivering spent catalyst to the chamber; a combustion gas distributor in the chamber for distributing air to the spent catalyst in the chamber for combusting coke from the spent catalyst to produce regenerated catalyst and flue gas; a flue gas outlet from the chamber; a catalyst cooler appended to the chamber for receiving hot catalyst and cooling the hot catalyst; and a vent from the catalyst cooler having an inlet end and an outlet end; and a conduit or a vessel connected with the outlet end of the vent and the conduit or vessel is outside of the regenerator. An embodiment of the disclosure is one, any or all of prior embodiments in this paragraph up through the first embodiment in this paragraph further comprising a pipe for passing hot catalyst from the regenerator to the catalyst cooler. An embodiment of the disclosure is one, any or all of prior embodiments in this paragraph up through the first embodiment in this paragraph wherein an inlet end of the vent is above an outlet of the pipe. An embodiment of the disclosure is one, any or all of prior embodiments in this paragraph up through the first embodiment in this paragraph wherein the conduit or vessel is a flue gas conduit having an inlet in downstream communication with the flue gas outlet. An embodiment of the disclosure is one, any or all of prior embodiments in this paragraph up through the first embodiment in this paragraph wherein the conduit or vessel is a catalyst storage vessel. An embodiment of the disclosure is one, any or all of prior embodiments in this paragraph up through the first embodiment in this paragraph wherein the conduit or vessel is a separator for separating catalyst fines from flue gas. An embodiment of the disclosure is one, any or all of prior embodiments in this paragraph up through the first embodiment in this paragraph wherein the catalyst regenerator has an upper chamber and a lower chamber and the pipe passes hot catalyst from the upper chamber to the catalyst cooler and the catalyst cooler has a drain which passes cooled catalyst to the lower chamber. An embodiment of the disclosure is one, any or all of prior embodiments in this paragraph up through the first embodiment in this paragraph wherein the catalyst cooler has nested tubes for providing cooling media, the nested tubes comprising inner tubes with inlets above the outlets.

A second embodiment of the disclosure is a process for regenerator a spent catalyst comprising feeding a stream of spent catalyst to a catalyst regenerator and combusting coke from the spent catalyst by contact with oxygen to produce regenerated catalyst and a flue gas; exhausting the flue gas stream from the catalyst regenerator; cooling the regenerated catalyst in a catalyst cooler; and venting a cooler gas stream from the catalyst cooler downstream or outside of the catalyst regenerator. An embodiment of the disclosure is one, any or all of prior embodiments in this paragraph up through the second embodiment in this paragraph wherein a cooler catalyst level in the catalyst cooler is at about the same height as a catalyst level in the catalyst regenerator. An embodiment of the disclosure is one, any or all of prior embodiments in this paragraph up through the second embodiment in this paragraph further comprising passing regenerated catalyst to the catalyst cooler below where the cooler gas stream is vented from the catalyst cooler. An embodiment of the disclosure is one, any or all of prior embodiments in this paragraph up through the second embodiment in this paragraph further comprising exhausting a flue gas stream from the catalyst regenerator and venting the cooler gas stream from the catalyst cooler into the flue gas stream. An embodiment of the disclosure is one, any or all of prior embodiments in this paragraph up through the second embodiment in this paragraph further comprising exhausting a flue gas stream from the catalyst regenerator, separating catalyst fines from the exhausted flue gas stream to provide a catalyst fines underflow stream and venting the cooler gas to the underflow stream. An embodiment of the disclosure is one, any or all of prior embodiments in this paragraph up through the second embodiment in this paragraph further comprising venting the cooler gas stream and filtering catalyst fines from the cooler gas stream. An embodiment of the disclosure is one, any or all of prior embodiments in this paragraph up through the second embodiment in this paragraph further comprising venting the cooler gas stream to a catalyst containment vessel including a filter which filters catalyst fines from the cooler gas stream to provide a filtered cooler gas stream. An embodiment of the disclosure is one, any or all of prior embodiments in this paragraph up through the second embodiment in this paragraph further comprising feeding the filtered cooler gas stream to a combustion unit. An embodiment of the disclosure is one, any or all of prior embodiments in this paragraph up through the second embodiment in this paragraph further comprising feeding a liquid cooling media to the catalyst cooler, the liquid cooling media flowing downwardly in the catalyst cooler. An embodiment of the disclosure is one, any or all of prior embodiments in this paragraph up through the second embodiment in this paragraph further comprising fluidizing the regenerated catalyst in the catalyst regenerator with a fluidization gas.

A third embodiment of the disclosure is an catalyst regenerator comprising a shell defining an upper chamber and a lower chamber; a catalyst inlet to the upper chamber for delivering spent catalyst to the upper chamber; an air distributor for distributing air to the spent catalyst for combusting coke from the spent catalyst to produce regenerated catalyst and flue gas; a flue gas outlet from the chamber; a catalyst cooler appended to the upper chamber for receiving hot catalyst from the upper chamber and cooling the hot catalyst; and the catalyst cooler has nested tubes for providing cooling media, the nested tubes comprising inner tubes with inlets above the outlets. An embodiment of the disclosure is one, any or all of prior embodiments in this paragraph up through the third embodiment in this paragraph further comprising a vent from the catalyst cooler having an inlet end and an outlet end and a conduit or a vessel connected with the outlet end of the vent and the conduit or vessel is outside of the regenerator.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A catalyst regenerator comprising:
   a shell defining a chamber;
   a catalyst inlet to said chamber for delivering spent catalyst to said chamber;
   a combustion gas distributor in said chamber for distributing air to said spent catalyst in said chamber for combusting coke from said spent catalyst to produce regenerated catalyst and flue gas;
   a flue gas outlet from said chamber;
   a catalyst cooler appended to said chamber for receiving hot catalyst and cooling said hot catalyst; and
   a vent from said catalyst cooler having an inlet end and an outlet end; and
   a conduit or a vessel connected with said outlet end of said vent and said conduit or vessel is outside of said regenerator.

2. The catalyst regenerator of claim 1 further comprising a pipe for passing hot catalyst from said regenerator to said catalyst cooler.

3. The catalyst regenerator of claim 2 wherein the inlet end of said vent is above an outlet of said pipe.

4. The catalyst regenerator of claim 2 wherein said catalyst regenerator has an upper chamber and a lower chamber and said pipe passes hot catalyst from said upper chamber to said catalyst cooler and said catalyst cooler has a drain which passes cooled catalyst to said lower chamber.

5. The catalyst regenerator of claim 1 wherein said conduit or vessel is a flue gas conduit having an inlet in downstream communication with said flue gas outlet.

6. The catalyst regenerator of claim 1 wherein said conduit or vessel is a catalyst storage vessel.

7. The catalyst regenerator of claim 1 wherein said conduit or vessel is a separator for separating catalyst fines from flue gas.

8. The catalyst regenerator of claim 1 wherein said catalyst cooler has nested tubes for providing cooling media, said nested tubes comprising inner tubes with inlets above said outlets.

9. A process for regenerator a spent catalyst comprising:
   feeding a stream of spent catalyst to a catalyst regenerator and combusting coke from said spent catalyst by contact with oxygen to produce regenerated catalyst and a flue gas;
   exhausting said flue gas from said catalyst regenerator;
   cooling said regenerated catalyst in a catalyst cooler; and
   venting a cooler gas stream from said catalyst cooler downstream or outside of said catalyst regenerator.

10. The process of claim 9 wherein a cooler catalyst level in said catalyst cooler is at about the same height as a catalyst level in said catalyst regenerator.

11. The process of claim 9 further comprising passing regenerated catalyst to said catalyst cooler below where said cooler gas stream is vented from said catalyst cooler.

12. The process of claim 9 further comprising exhausting a flue gas stream from said catalyst regenerator and venting said cooler gas stream from said catalyst cooler into said flue gas stream.

13. The process of claim 9 further comprising exhausting a flue gas stream from said catalyst regenerator, separating catalyst fines from said exhausted flue gas stream to provide a catalyst fines underflow stream and venting said cooler gas to said underflow stream.

14. The process of claim 9 further comprising venting said cooler gas stream and filtering catalyst fines from said cooler gas stream.

15. The process of claim 14 further comprising venting said cooler gas stream to a catalyst containment vessel including a filter which filters catalyst fines from said cooler gas stream to provide a filtered cooler gas stream.

16. The process of claim 15 further comprising feeding said filtered cooler gas stream to a combustion unit.

17. The process of claim 9 further comprising feeding a liquid cooling media to said catalyst cooler, said liquid cooling media flowing downwardly in said catalyst cooler.

18. The process of claim 9 further comprising fluidizing the regenerated catalyst in the catalyst regenerator with a fluidization gas.

19. A catalyst regenerator comprising:
a shell defining an upper chamber and a lower chamber;
a catalyst inlet to said upper chamber for delivering spent catalyst to said upper chamber;
an air distributor for distributing air to said spent catalyst for combusting coke from said spent catalyst to produce regenerated catalyst and flue gas;
a flue gas outlet from said chamber;
a catalyst cooler appended to said upper chamber for receiving hot catalyst from said upper chamber and cooling said hot catalyst; and
said catalyst cooler has nested tubes for providing cooling media, said nested tubes comprising inner tubes with inlets above an outlet of the nested tubes.

20. The catalyst regenerator of claim 19 further comprising a vent from said catalyst cooler having an inlet end and an outlet end and a conduit or a vessel connected with said outlet end of said vent and said conduit or vessel is outside of said regenerator.

* * * * *